(12) United States Patent
Sakoske et al.

(10) Patent No.: US 7,527,832 B2
(45) Date of Patent: May 5, 2009

(54) PROCESS FOR STRUCTURING SELF-CLEANING GLASS SURFACES

(75) Inventors: George E. Sakoske, Washington, PA (US); Martin Baumann, Frankfurt (DE); Enos A. Axtell, III, Washington, PA (US)

(73) Assignee: Ferro Corporation, Cleveland, OH (US)

( * ) Notice: Subject to any disclaimer, the term of this patent is extended or adjusted under 35 U.S.C. 154(b) by 611 days.

(21) Appl. No.: 11/115,945

(22) Filed: Apr. 27, 2005

(65) Prior Publication Data
US 2006/0246297 A1 Nov. 2, 2006

(51) Int. Cl.
C23C 4/10 (2006.01)
C23C 4/12 (2006.01)
C23C 4/18 (2006.01)

(52) U.S. Cl. .................. 427/450; 427/451; 427/452; 427/454; 427/446

(58) Field of Classification Search .................. 427/454
See application file for complete search history.

(56) References Cited

U.S. PATENT DOCUMENTS

| | | | | |
|---|---|---|---|---|
| 3,936,295 A | * | 2/1976 | Cromwell et al. | .............. 75/252 |
| 3,939,249 A | * | 2/1976 | Huege | .......................... 423/178 |
| 4,868,228 A | * | 9/1989 | Gonnet et al. | ............... 523/333 |
| 6,649,266 B1 | | 11/2003 | Gross et al. | |
| 6,683,126 B2 | | 1/2004 | Keller et al. | |
| 6,733,843 B2 | | 5/2004 | Tsukatani et al. | |
| 6,762,396 B2 | | 7/2004 | Abbott et al. | |
| 6,872,441 B2 | | 3/2005 | Baumann et al. | |
| 2001/0026859 A1 | | 10/2001 | Nakamura et al. | |
| 2002/0114945 A1 | | 8/2002 | Greenberg et al. | |
| 2002/0142150 A1 | | 10/2002 | Baumann et al. | |
| 2003/0037569 A1 | | 2/2003 | Arab et al. | |
| 2004/0023078 A1 | | 2/2004 | Rosenflanz et al. | |
| 2004/0237590 A1 | | 12/2004 | Sakoske et al. | |
| 2005/0227045 A1 | * | 10/2005 | Oles et al. | .................... 428/143 |

FOREIGN PATENT DOCUMENTS

| | | | |
|---|---|---|---|
| JP | 57-134562 | * | 8/1982 |
| JP | 01-201033 | * | 8/1989 |
| WO | 2004/015022 | * | 2/2004 |

OTHER PUBLICATIONS

Metals Handbook Ninth Edition, vol. 5, Surface Cleaning, Finishing, and Coating, American Society For Metals, 1982, pp. 361, 363.*
English Translation of Japan 57-134562, originally published in Japanese Aug. 19, 1982.*

* cited by examiner

*Primary Examiner*—Katherine A Bareford
(74) *Attorney, Agent, or Firm*—Rankin, Hill & Clark LLP

(57) ABSTRACT

A plasma spray process for structuring self-cleaning glass surfaces and self-cleaning glass surfaces formed according to the process. Molten or heat softened particles of inorganic material are plasma spray deposited onto the surface of a substrate to create a micro-rough surface. If desired, a hydrophobic top coating layer can optionally be applied to the micro-rough surface. The micro-structured surface formed according to the invention is durable and self-cleaning.

7 Claims, 6 Drawing Sheets

2FIG. 3a
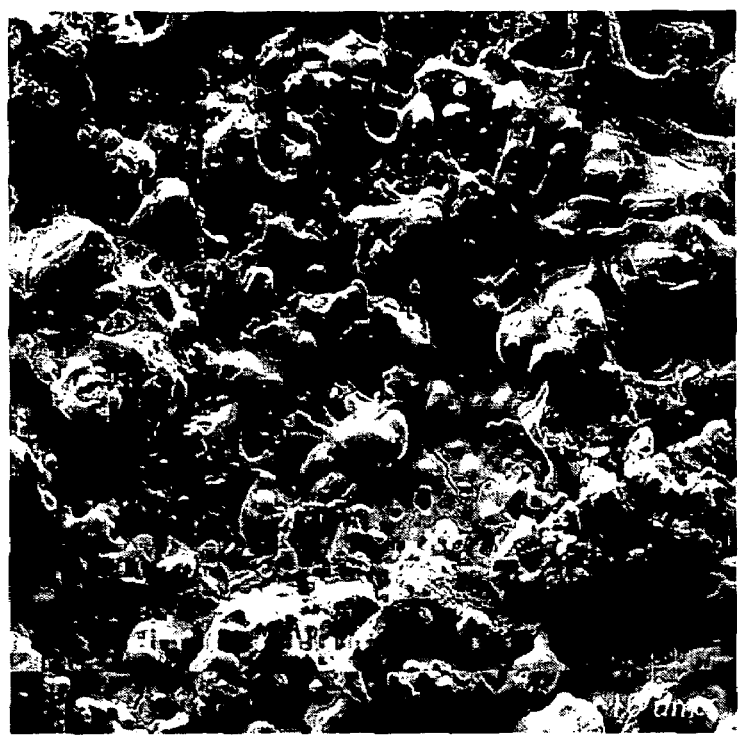
FIG. 3b
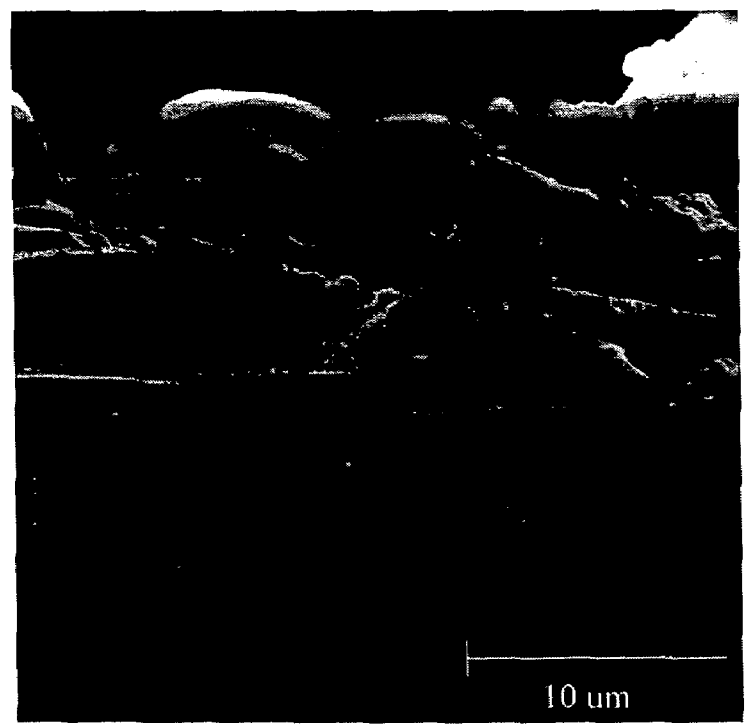

PROCESS FOR STRUCTURING SELF-CLEANING GLASS SURFACES

BACKGROUND OF THE INVENTION

1. Field of Invention

The present invention relates to a process for structuring surfaces and, more particularly, to a plasma spray process for structuring self-cleaning glass surfaces and self-cleaning glass surfaces formed according to the process.

2. Description of Related Art

Conventional glass surfaces that are exposed to rainwater require frequent cleaning to remove the deposits or residues that remain when water droplets containing dissolved or suspended solids evaporate. The cleaning of glass surfaces is time consuming and costly. A self-cleaning glass surface is highly desired.

The leaves of some plants such as the lotus plant, for example, are self-cleaning in the sense that water droplets tend to roll off the surface of the leaves instead of evaporating from the leaves. The lotus plant excretes small amounts of wax on the surface of the leaf in the form of very small bumps or nodules that are spaced apart a small distance from each other to create a micro-rough surface. The wax is very hydrophobic, which causes rainwater to form beads or droplets with a very small contact angle rather than a continuous wet film on the surface of the leaves. The water droplets roll off the surface of the lotus leaves taking dissolved and suspended solids with them. In this sense, the leaf surface of the lotus plant is self-cleaning, which is sometimes referred to as "the lotus effect".

Efforts to duplicate the lotus effect on the surface of glass have not been particularly successful. The application of small bumps or nodules of wax to the surface of glass would be difficult to achieve and would be impractical because it would most likely deteriorate the transparency of the glass. Furthermore, because waxes are softer than glass, any mechanical contact with the glass surface would likely damage the micro-rough surface structure.

Several self-cleaning glass coatings have been developed in recent years based upon extremely hydrophobic perfluorinated polymers. Coatings formed using perfluorinated polymers are typically bonded to glass surfaces or intermediate coating layers using functional polysiloxanes. Unfortunately, such coatings do not impart super-hydrophobicity (contact angles greater than 140°) because they tend to have a relatively smooth surface. Furthermore, these coatings are not particularly durable. The properties of perfluorinated polymer coated glass surfaces are merely hydrophobic (contact angles ~100°), and are not truly self-cleaning.

An alternative method of forming a self-cleaning glass surface is to create a micro-rough or micro-structured glass surface. Surface structures of this type feature regular or irregular peaks and valleys of 0.1 µm or greater. Depending on the surface treatment of the structured surface, the structuring can have various effects. When the surface is treated with a hydrophobic agent, the structuring tends to reduce the adhesion of water and solids and create a self-cleaning surface, called a super-hydrophobic surface. When the surface is hydrophilic, the structuring tends to aid in wetting of the surface, creating a super-hydrophilic surface.

A variety of processes and treatments have been used to produce micro-rough surfaces on glass. Examples include grit blasting, acid etching, applying and firing of glassy coatings containing non-glass particulates, sol-gel coatings and techniques that utilize chemical vapor deposition ("CVD"), combustion chemical vapor deposition ("CCVD") and physical vapor deposition ("PVD"). These processes and treatments tend to be complicated, expensive and/or ineffective in creating durable self-cleaning surfaces.

BRIEF SUMMARY OF THE INVENTION

The present invention provides a process for structuring surfaces and, more particularly, a plasma spray process for structuring self-cleaning glass surfaces. The present invention also provides self-cleaning glass surfaces formed according to the process.

In a first embodiment of the invention, particles of inorganic material are heat softened or molten plasma spray deposited onto the surface of a substrate to create a micro-rough surface. The particles preferably comprise powdered inorganic oxides of elements selected from the group consisting of Si, Al, Bi, P, Ti, Sr, Y, Nb, Ba, La, Ta, Sn, Sb, B, Ca, Li, Na, K, Zn, Te, Ge, Ga, Ce, Pr, Nd, Cr, Mn, Fe, Ni, Cu, Co, W, Mo and combinations of two or more thereof. Alternatively, the particles can comprise nitrides, carbides, fluorides or sulfides of such elements. The substrate is preferably glass, but the process can be used to form micro-structured surfaces on other surfaces such as ceramics, metals, and plastics.

In accordance with the process of the invention, the particles of inorganic material exit the plasma spray gun in a molten or heat softened state and then impinge against the substrate or against the remnants of particles previously directed toward the substrate. The molten or heat softened particles rapidly cool and adhere to the substrate and/or the previously applied particles upon contact. The rapid, random accumulation or build up of particles forms a micro-rough surface on the substrate that is characterized by an irregular network of peaks and valleys having a difference in elevation within the range of from about 5 nm to about 50 µm. If the deposited microstructure is not hydrophobic in nature, a hydrophobic topcoat layer can be applied to the micro-structured layer.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

BRIEF DESCRIPTION OF THE DRAWINGS

FIGS. 3a and 3b are scanning electron micrographs of a structured glass surface formed from Mg stabilized $ZrO_2$ according to the invention.

DETAILED DESCRIPTION OF THE INVENTION

Figure 1:
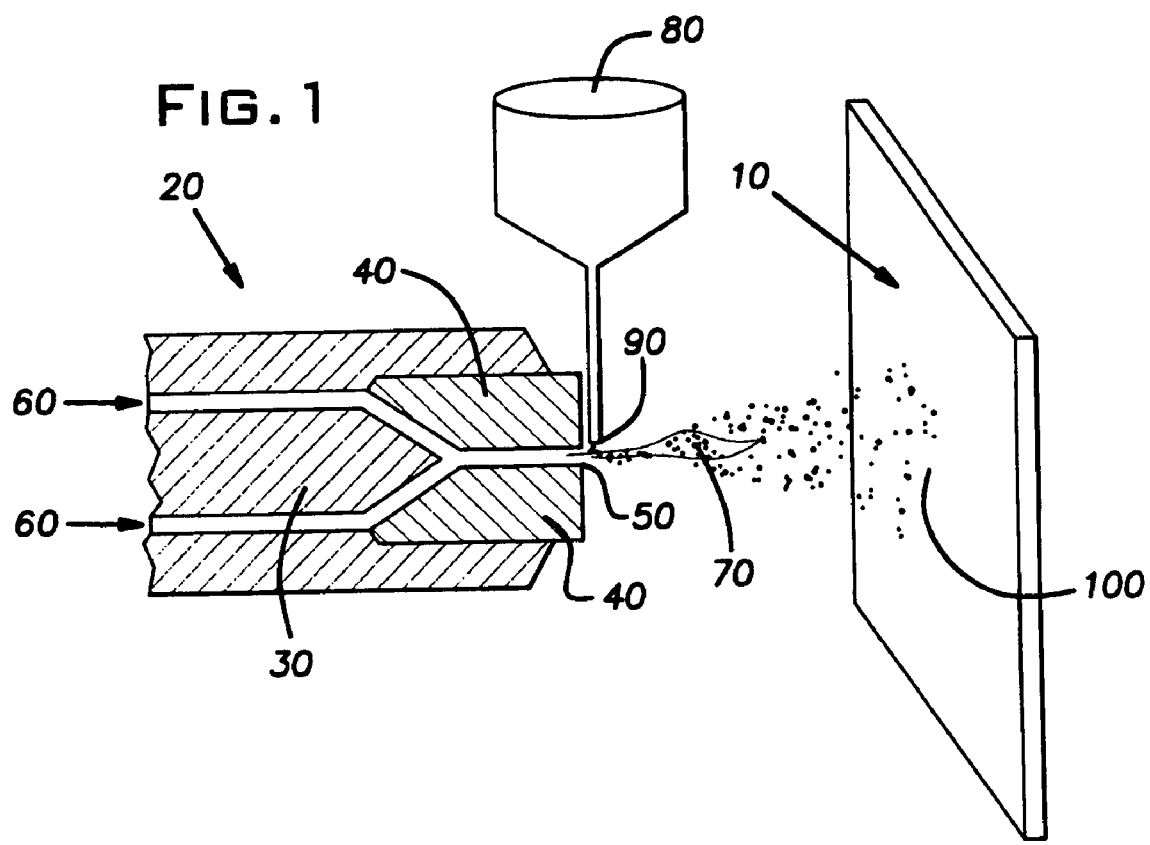
FIG. 1 is a schematic representation of an apparatus for carrying out the process of the invention.

The process according to the present invention is schematically illustrated in FIG. 1. A substrate 10 such as a pane of glass is placed an appropriate distance from a plasma spray apparatus 20. The plasma spray apparatus 20 comprises a cathode 30, which is typically formed of tungsten, and an anode 40, which is typically formed of copper. The anode 40 is spaced apart from the cathode 30 and is shaped so as to form a constricting nozzle 50.

A gas 60 is pumped around the cathode 30 and through the anode 40 such that it exits the nozzle 50. The gas 60 is typically argon, nitrogen, hydrogen, helium or a combination of two or more thereof. High voltage discharge between the cathode 30 and anode 40 causes an arc to form between the cathode 30 and the anode 40. Resistance heating from the arc causes the gas 60 to reach extremely high temperatures, dissociate and ionize to form a plasma, which is an electrically conductive gas containing charged particles. When atoms of the gas 60 are excited to high energy levels by the arc between the cathode 30 and anode 40, the atoms lose some of their electrons and become ionized producing a plasma containing electrically charged particles, namely ions and electrons. The re-association of the ions and electrons provides energy that can be used to heat particulate inorganic material fed into the plasma. The plasma exits the nozzle 50 as a plasma gas arc flame 70.

The plasma spray apparatus 20 further comprises a powder vessel 80 that includes a port 90 that discharges particulate inorganic material into the plasma gas arc flame 70 proximate to the nozzle 50. The particulate inorganic material is rapidly heated to a molten or heat softened state and is accelerated toward the substrate 10 by the flow of the plasma gas arc flame 70. The molten or heat softened particles impinge against the substrate 10 or against the remnants of particles previously directed toward the substrate. The molten or heat softened particles rapidly cool and adhere to and bond to the substrate and/or the previously applied particles upon contact. The rapid, random accumulation or build up of particles forms a micro-rough or nano-rough surface on the substrate that is characterized by an irregular network of peaks and valleys having a difference in elevation within the range of from about 5 nm to about 50 μm.

The plasma spray process can be considered a "cold" process in the sense that the temperature of the substrate need not be elevated. Preferably, the temperature of the substrate is not controlled, but is permitted to remain at ambient temperature during processing. Furthermore, impingement of the molten or heat softened particles of inorganic material does not transfer large amounts of heat to the substrate, which reduces thermal shock and degradation of the substrate. The plasma spray process is most commonly used at ambient temperatures and atmospheric conditions. However, the temperature of the substrate can be elevated, if desired. Alternatively, the process can be conducted in a vacuum chamber that has been back filled with a protective gas at low pressure.

Throughout the instant specification and in the appended claims, the term "plasma spray" should be understood as referring to the aforementioned process whereby a gas such as argon, helium, hydrogen and/or nitrogen passes between a cathode and an anode and is heated to form a plasma gas arc flame that carries molten or heat softened particulate inorganic material to a substrate. The term "plasma spray" is not intended to refer to other thermal spray processes such as, for example, the combustion wire thermal spray process, the combustion powder thermal spray process, the arc wire thermal spray process, the high velocity oxygen fuel thermal spray process, the detonation thermal spray process, and the cold spray coating process, which are described in detail in a series of web pages maintained by Gordon England of Surrey, England, entitled Thermal Spray Coatings (http://www.gordonengland.co.uk).

Depending upon the gas used, plasma gas arc flames can produce temperatures from about 7,000 K to about 20,000 K, which is higher than most thermal spray processes. These temperatures are far above the melting point of most inorganic materials. Particulate inorganic material that is fed into the plasma gas arc flame rapidly melts or softens while simultaneously being accelerated toward the substrate. Plasma sprayed coatings are very dense, strong and clean compared to coatings formed by other processing techniques.

Nitrogen and hydrogen are diatomic gases and thus have higher energy potentials for a given temperature than monatomic gases such as argon and helium. Nitrogen is the least expensive plasma gas and is inert to most particulate inorganic materials. Argon is a preferred plasma gas because it easily forms plasma and tends to damage the spray apparatus the least during operation. Argon is typically used with hydrogen or nitrogen, which increase the energy of the plasma gas arc flame.

As noted above, the plasma spraying of molten or heat softened particles of inorganic material rapidly builds up a micro-rough or nano-rough surface on the substrate that is characterized by an irregular network of peaks and valleys having a difference in elevation within the range of from about 5 nm to about 50 μm. This micro-rough or nano-rough surface structure, if hydrophobic, is self-cleaning. Dust and debris does not readily adhere to the structured surface, and water does not wet the surface, but rather it remains in bead form with a very small amount of contact. Water droplets roll off the structured surface, taking dust and debris with it.

The preferred substrate for use in the invention is glass such as architectural glass, window glass and automotive glass. Other glass substrates such as lenses, beverage containers and microscope slides can also be structured in accordance with the invention. Because the molten or heat softened inorganic material does not transfer large amounts of heat to the substrate, substrates other than glass can also be treated. Alternative substrates include, for example, metals, ceramics, and plastics.

The particulate inorganic material used to form the micro or nano-structure according to the invention is preferably an oxide of elements selected from the group consisting of Si, Al, Bi, P, Ti, Sr, Y, Nb, Ba, La, Ta, Sn, Sb, B, Ca, Li, Na, K, Zn, Te, Ge, Ga, Ce, Pr, Nd, Cr, Mn, Fe, Ni, Cu, Co, W, Mo and combinations of the foregoing. Nitrides, carbides, fluorides, sulfides, and metals can also be used, as can precursor materials such as nitrates and carbonates. Alternatively, the particulate inorganic material can comprise one or more glass frits. Combinations of the above mentioned materials can also be used (e.g., particles of a glass frit blended with particles of $ZrO_2$). It will be appreciated that the particulate inorganic material used in the invention can be coated with organic compounds, which can aid the flow of the material and/or include elements such as fluorine, which may impart hydrophobicity to the resulting surface.

In a first embodiment of the invention, the micro or nano-structure is formed as a single structuring layer on the substrate. The single structuring layer can be formed by depositing particles of one or more inorganic materials that are substantially the same size (i.e., the size distribution is narrow), particles having a bi-modal particle size distribution, particles that have a multi-modal particle size distribution, or that have a broad distribution of particle sizes. Typically, the particles will have a size within the range of from about 2 nm to about 300 μm. The preferred particle size is from about 20 μm to about 100 μm.

Figure 2:
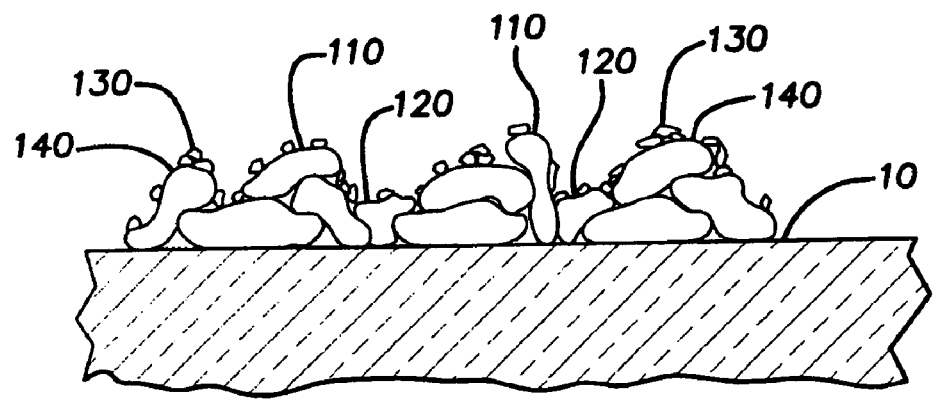
FIG. 2 is a schematic cross-sectional representation of an embodiment of a structured surface according to the invention.
Figure 4A:
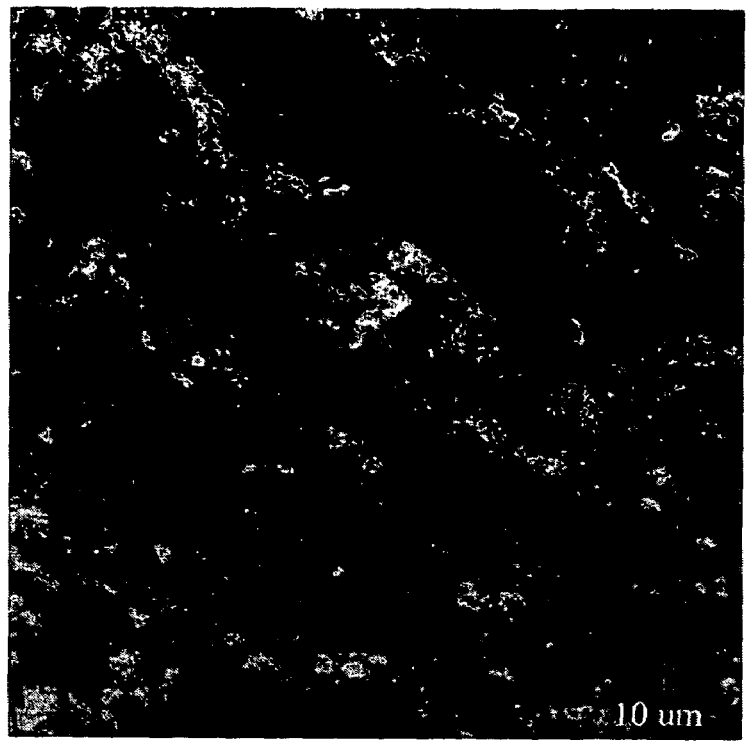
FIGS. 4a-4d are scanning electron micrographs of a structured glass surface formed from $Al_2O_3$ according to the invention.
Figure 4B:
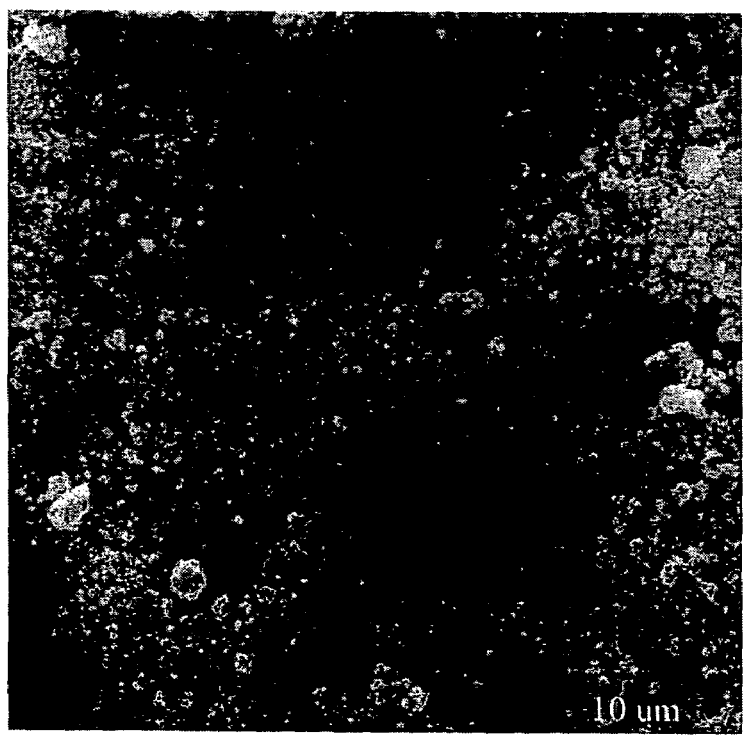
Figure 4C:
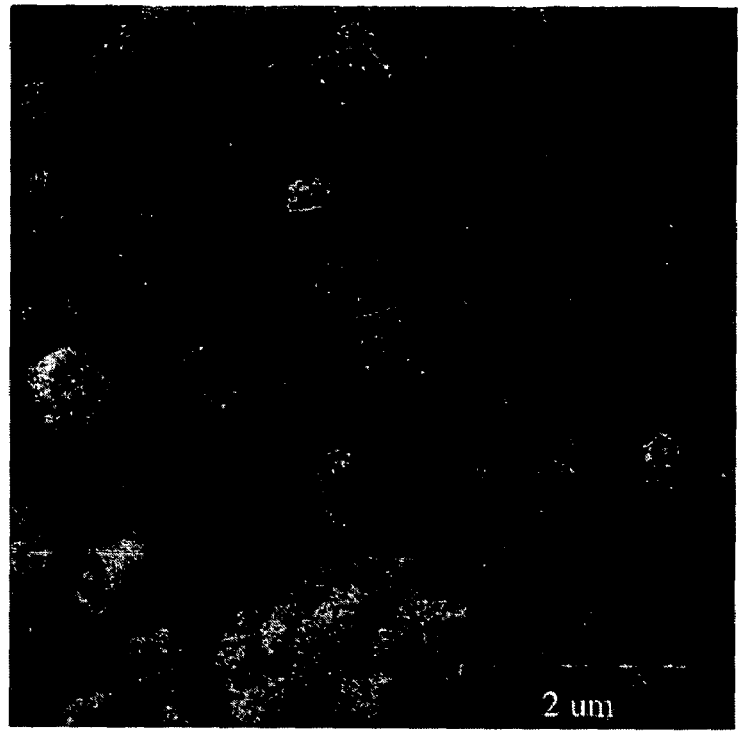
Figure 4D:
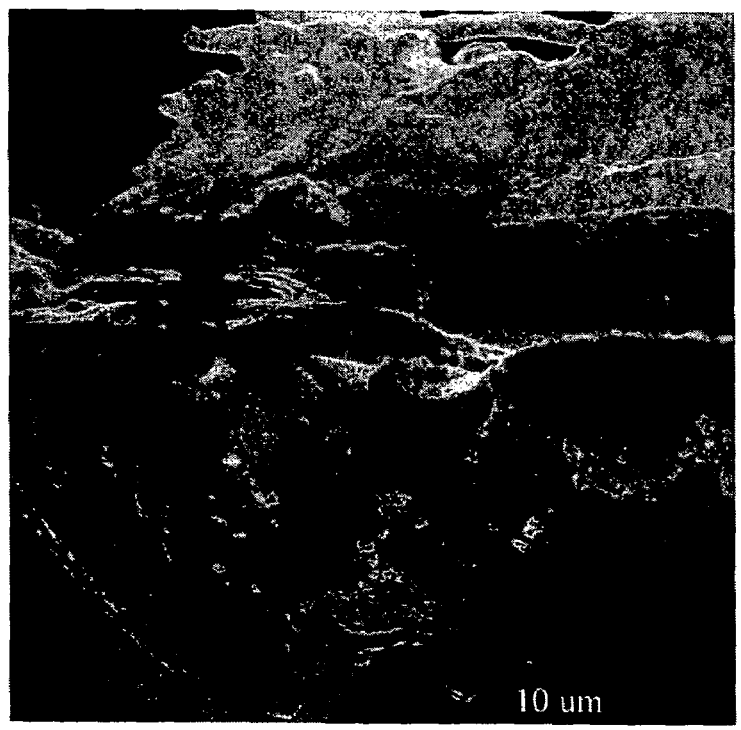
Figure 5A:
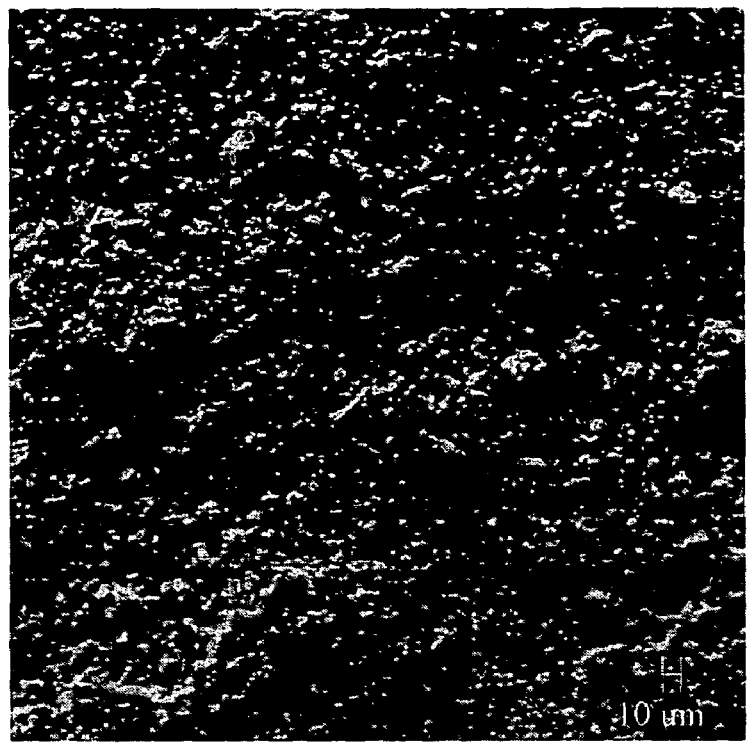
FIGS. 5a-5c are scanning electron micrographs of a structured glass surface formed from $SiO_2$ according to the invention.
Figure 5B:
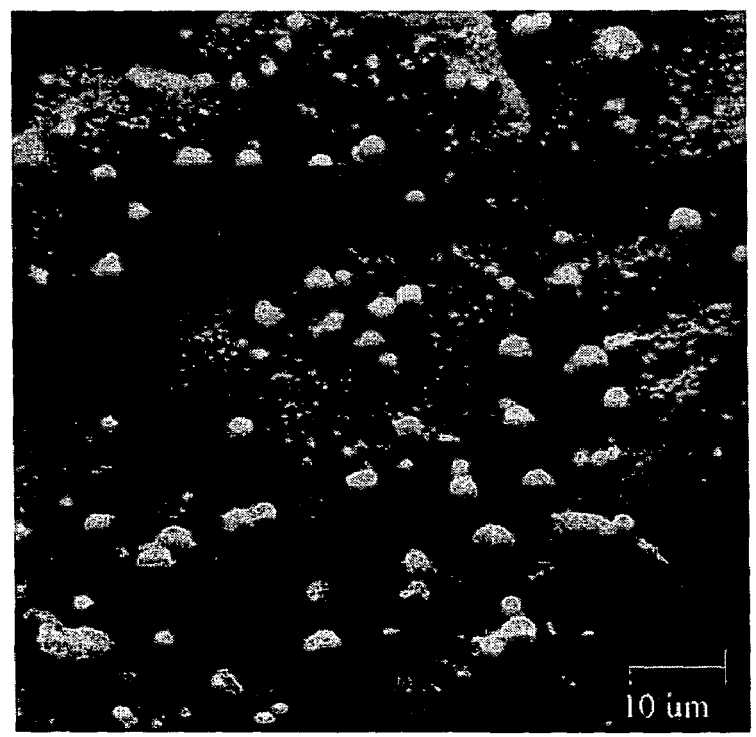
Figure 5C:
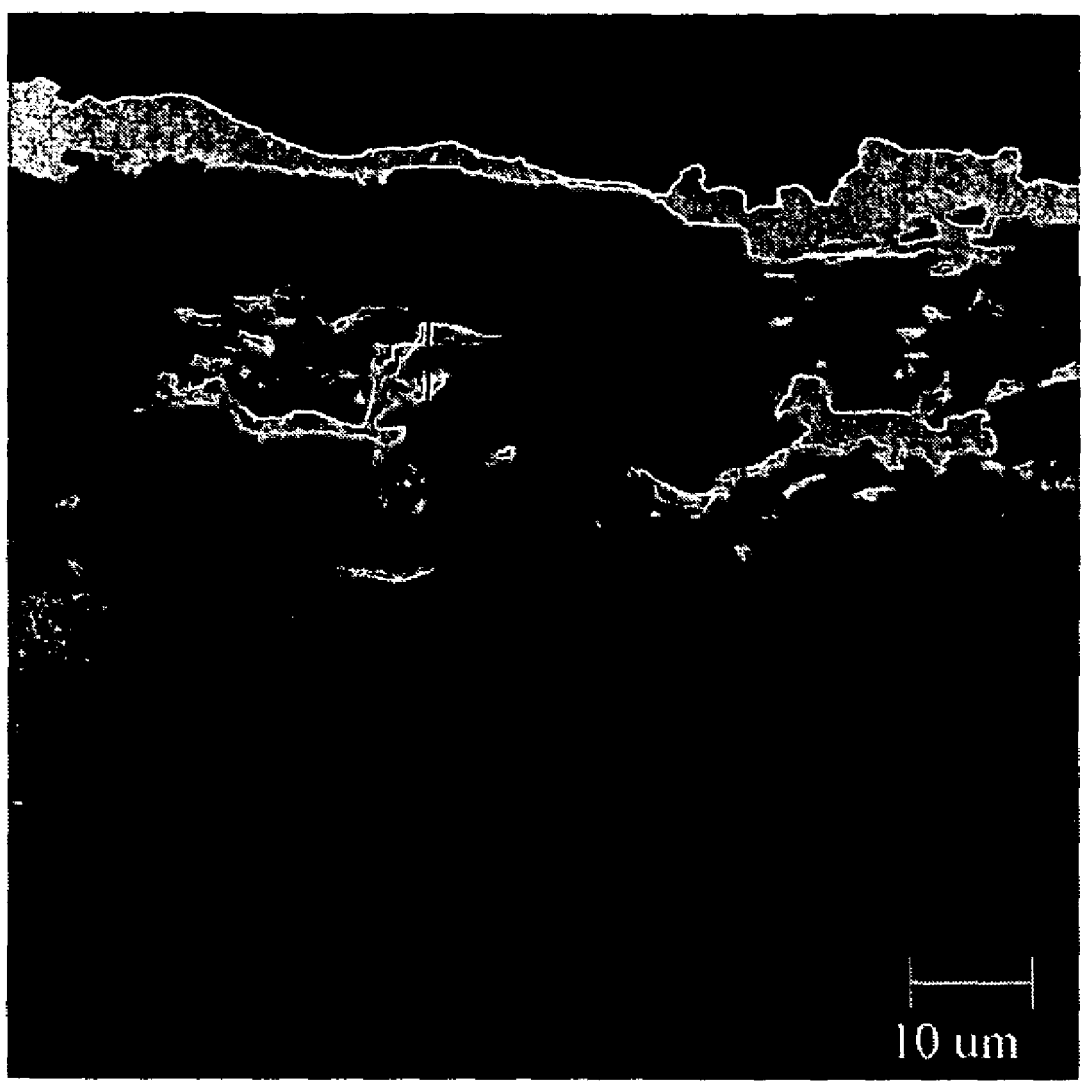

In a second embodiment of the invention, the micro or nano-structure is formed as a multi-layer structure on the substrate. The first layer may be formed by plasma spraying coarse structuring particles (e.g., a first amount of particles having an average diameter of from about 0.2 microns to less than about 100 microns) on the substrate followed by application of one or more second layers, which may be formed by plasma spraying fine structuring particles (e.g., a second amount of particles having an average diameter that is less than half of the diameter of the course particles) on the first layer. FIG. 2 shows a schematic representation of a structure formed on a substrate 10 comprising relatively large peaks 110 and deep valleys 120 formed by plasma spraying coarse structuring particles that are themselves structured with small peaks 130 and shallow valleys 140 formed by plasma spraying fine structuring particles on the first layer. The difference in elevation between the large peaks 110 and deep valleys 120 is preferably in the micron range and thus provides a micro-structure, and the difference in elevation between the small peaks 130 and shallow valleys 140 is preferably in the nanometer range and thus provides a nano-structure.

In a third embodiment of the invention, the structured surface is formed by an alternative multi-layer approach. A first layer can be deposited on the glass by the plasma spray process described above. A second structuring layer can be applied by conventional means such as spraying, screen-printing, dip coating or roll coating for example. The glass is then heated to bond this layer to the plasma sprayed surface. Subsequent treatment with a hydrophobic topcoat completes the coating.

If the exposed structuring layer is not hydrophobic in nature, a "topcoat" layer of hydrophobic material can be applied to the structuring layer. Hydrophobic materials can be applied by plasma spray, if desired, or by other convention methods such as spraying or dipping. A hydrophobic surface improves the self-cleaning properties of the structured layer.

The plasma sprayed structuring layer or layers is more durable than conventional self-cleaning coatings. The particles of inorganic material are dense and are strongly bonded to the substrate. This improves the scratch resistance of the coating. Furthermore, hydrophobic inorganic materials and structures can be formed without the need for relatively soft fluoropolymers.

The following examples are intended only to illustrate the invention and should not be construed as imposing limitations upon the claims.

EXAMPLE 1

One part by volume of concentrated hydrochloric acid was dissolved in 3600 parts of distilled water. This solution was labeled Acid 1. One part by volume of concentrated hydrochloric acid was dissolved in 200 parts of distilled water. This solution was labeled Acid 2. 980 g of isopropanol was weighed into a plastic jar. 20 g of Aerosil 200, a fumed silica with a surface area of 200 $m^2/g$ available from Degussa, was weighed into the jar on top of the isopropanol. The mixture was shaken together to wet the Aerosil. The suspension was dispersed in a homogenizer available from Microfluidics at a pressure of 18000 psi. This Fumed Silica Suspension was stored in a plastic jar for later use.

EXAMPLE 2

106.36 g of denatured ethanol was placed in a round bottom flask. 0.7 g of tetraethylorthosilicate (TEOS) was weighed and added drop wise to the stirring ethanol. The beaker was rinsed with 10 g of ethanol. 1.4 g of Acid 1 from Example 1 was weighed. The acid was added drop wise to the stirring solution. 10 g of ethanol was used to rinse the beaker. This ethanol was added to the round bottom flask. While continuing to stir the solution, a condenser was placed on the round bottom flask and heat was applied from a heating mantle. The heat was increased incrementally to achieve a temperature of 60° C. After heating at 60° C. for one hour, the heating mantle was removed from the round bottom flask and the flask was bathed in cool tap water to return the solution to approximately room temperature (20° C.). 1.4 g of Acid 2 from Example 1 was then weighed. This acid solution was added drop wise to the stirring ethanol/TEOS solution. 10 g of ethanol was used to rinse the vessel. This ethanol was added to the round bottom flask. The solution was stirred at room temperature for 20 minutes and then stored in a plastic bottle. This solution was labeled as the Lotus Primer.

EXAMPLE 3

150 g of the Fumed Silica Suspension described in Example 1 and 225 g of denatured ethanol were placed in a round bottom flask. 1.5 g of tetra-ethyl orthosilicate (TEOS, available from Degussa), and 1.23 g methyl-triethoxysilane (MTES, available from Gelest) were weighed and added drop wise to the stirring suspension. The beaker was rinsed with a small portion of ethanol. 2.25 g of Acid 1 from Example 1 was weighed. The acid was added drop wise to the stirring solution. A small portion of ethanol was used to rinse the beaker. This ethanol was added to the round bottom flask. While continuing to stir the solution, a condenser was placed on the round bottom flask and heat was applied from a heating mantle. The heat was increased incrementally to achieve a temperature of 60° C. After heating at 60° C. for one hour, the heating mantle was removed from the round bottom flask and the flask was bathed in cool tap water to return the solution to approximately room temperature (20° C.). 2.25 g of Acid 2 from Example 1 was then weighed. This acid solution was added drop wise to the stirring suspension. 10 g of ethanol was used to rinse the vessel. This ethanol was added to the round bottom flask. The suspension was stirred at room temperature for 20 minutes and then stored in a bottle. The suspension was labeled as Lotus Nano-Structuring Spray.

EXAMPLE 4

106.36 g of denatured ethanol was placed in a round bottom flask. 1.71 g of Dynasylan F8261 (1,1,2,2-tetrahydroperfluorooctyltriethoxysilane, available from Degussa) was weighed and added drop wise to the stirring ethanol. The beaker was rinsed with 10 g of ethanol. 1.4 g of Acid 1 from Example 1 was weighed. The acid was added drop wise to the stirring solution. 10 g of ethanol was used to rinse the beaker. This ethanol was added to the round bottom flask. While continuing to stir the solution, a condenser was placed on the round bottom flask and heat was applied from a heating mantle. The heat was increased incrementally to achieve a temperature of 60° C. After heating at 60° C. for one hour, the heating mantle was removed from the round bottom flask and the flask was bathed in cool tap water to return the solution to approximately room temperature (20° C.). 1.4 g of Acid 1 from Example 2 was then weighed. This acid solution was added drop wise to the stirring ethanol/silane solution. 10 g of ethanol was used to rinse the vessel. This ethanol was added to the round bottom flask. The solution was stirred at room temperature for 20 minutes and then stored in a bottle. The container was labeled as Lotus Topcoat.

EXAMPLE 5

Six pieces of SOLEX glass, available from PPG Industries, were plasma sprayed with Mg stabilized $ZrO_2$. The architectural glass substrate sprayed was a typical commercially available soda-lime-silica glass made by the float process. A typical commercially available plasma spray gun was used to apply coatings in the range of 10 um to 50 um. The Zirconium oxide powder used was a typical commercially available powder for plasma spray applications with an average particle size around 75 µm. Such powders are commercially available from Praxair and/or F. J. Brodman for example (see, e.g., www.praxair.com or www.fjbco.com). FIGS. 3a and 3b are scanning electron micrographs showing the surface of a piece of architectural glass after application of the Mg stabilized $ZrO_2$. No cracking was observed under the structuring layer. A 25 µl drop of de-ionized water was placed on one of the textured panes of glass. The water wetted the surface. The contact angle was therefore determined to be 10° or less. The drop did not roll off the surface of the pane of glass when the pane was tilted at an angle relative to horizontal.

EXAMPLE 6

4 inch by 4 inch panes of KRYSTAL KLEAR glass, available from APG, Inc., were plasma sprayed with silica powder using the plasma spray process to produce films of various thickness: Sample 1, <0.001 inch (<25 µm); Sample 2, 0.001 inches (25 µm); Sample 3, 0.003 inches (75 µm); and Sample 4, 0.005 inches (125 µm). Next, the Louts Primer formed in Example 2 was sprayed on the surface and air-dried. Next, the Lotus Topcoat formed in Example 4 was sprayed on the surface. This application was air-dried. The panes were then cured in a conventional drying oven at 190° C. for 30 minutes and then rinsed with hot tap water before measurements of the "un-rolling angle" were made. The term "un-rolling angle" is used here in place of the term more commonly used in the industry: "critical sliding angle." This is to distinguish the behavior of the water drop. The surface interaction is so small on a structured surface formed according to the invention that the water drop literally rolls down the surface, tumbling the dirt particles with it. The initial un-rolling angles appear in Table 1 below. The values are the average of two panes, with three drops measured for each pane, for a total of six drops. The "super-hydrophobic" effect is considered to occur when the average un-rolling angle is less than 15°.

TABLE 1

| Sample # | $SiO_2$ Film Depth | Initial Unrolling° |
|---|---|---|
| 1 | <0.001" | 22.70° |
| 2 | 0.001" | +45° |
| 3 | 0.003" | 14.8° |
| 4 | 0.005" | 19.1° |

EXAMPLE 7

Panes of KRYSTAL KLEAR glass were treated with alumina powder by the plasma spray process to produce the film thicknesses shown in Table 2 below. One half of each pane was treated with the Lotus Primer of Example 2 and the Lotus Topcoat of Example 4 using the same procedure as set forth in Example 6. Water droplet unrolling tests were performed as in Example 6, and the un-rolling angles are noted in Table 2 below.

TABLE 2

| Sample # | $Al_2O_3$ Film Depth | Initial Unrolling° |
|---|---|---|
| 5 | <0.001" | 16.3° |
| 6 | 0.001" | 29.7° |
| 7 | 0.003" | 3.2° |
| 8 | 0.005" | 14.3° |

EXAMPLE 8

The panes of SOLEX glass treated with Mg-stabilized $ZrO_2$ by the plasma spray process in Example 5 were further treated. One half of each pane was treated with the Lotus Primer of Example 2 and the Lotus Topcoat of Example 4, as described in Example 6. Water droplet unrolling tests were performed as in Example 6, and the un-rolling angles are noted in Table 3 below.

TABLE 3

| Sample # | $ZrO_2$ Film Depth | Initial Unrolling° |
|---|---|---|
| 9 | 0.001" | 45° |
| 10 | 0.001" | 26.7° |
| 11 | 0.003" | 3.7° |
| 12 | 0.003" | 3.5° |
| 13 | 0.005" | 3.3° |
| 14 | 0.005" | 6.8° |

EXAMPLE 9

4 inch by 4 inch panes of KRYSTAL KLEAR glass were plasma sprayed with silica powder using the plasma spray process to produce films of various thickness: Sample 15, <0.001 inch (<25 µm); Sample 16, 0.001 inches (25 µm); Sample 17, 0.003 inches (75 µm); and Sample 18, 0.005 inches (125 µm). Next, the Lotus Primer of Example 2 was sprayed on half of the surface and air-dried. The Lotus Nano-Structuring Spray of Example 3 was applied on top of this coating and air-dried. The substrate was fired for four minutes and 575° C. After cooling to room temperature in a fume hood, the Lotus Primer of Example 2 was again applied to the surface. The surface was then sprayed with the Lotus Topcoat of Example 4. This application was air-dried. The panes were then cured in a conventional drying at 190° C. for 30 minutes and were rinsed with hot tap water before measurements of the un-rolling angle were made. The values reported in Table 4 are the average of two panes, with three drops measured for each pane, for a total of six drops.

TABLE 4

| Sample # | $SiO_2$ Film Depth | Initial Unrolling° |
|---|---|---|
| 15 | <0.001" | 23.1° |
| 16 | 0.001" | +45° |
| 17 | 0.003" | 1.3° |
| 18 | 0.005" | 1.3° |

EXAMPLE 10

Panes of KRYSTAL KLEAR glass were treated with alumina powder by the plasma spray process to produce the film thicknesses shown in Table 5 below. Next, the Lotus Primer of Example 2 was sprayed on half the surface and air-dried. The Lotus Nano-Structure Spray of Example e was applied on top of this coating and air-dried. The substrate was fired for four minutes and 575° C. After cooling to room temperature in a fume hood, the Lotus Primer of Example 2 was again applied to the surface. This treatment was followed by spraying the surface with the Lotus Topcoat of Example 4. This application was air-dried. The panes were then cured in a conventional drying at 190° C. for 30 minutes and were rinsed with hot tap water before measurements of the un-rolling angle were made. The values reported in Table 5 below are the average of two panes, with three drops measured for each pane, for a total of six drops. The initial un-rolling angles are noted in Table 5 below.

TABLE 5

| Sample # | $Al_2O_3$ Film Depth | Initial Unrolling° |
|---|---|---|
| 19 | <0.001" | 1.9° |
| 20 | 0.001" | 2.6° |
| 21 | 0.003" | 0.5° |
| 22 | 0.005" | 1° |

EXAMPLE 11

Panes of SOLEX glass were treated with Mg-Stabilized-$ZrO_2$ by the plasma spray process, as described above. Next, the Lotus Primer of Example 2 was sprayed on half the surface and air-dried. The Lotus Nano-Structuring Spray of Example 3 was applied on top of this coating and air-dried. The substrate was fired for four minutes and 575° C. After cooling to room temperature in a fume hood, the Lotus Primer of Example 2 was again applied to the surface. This treatment was followed by spraying the surface with the Lotus Topcoat of Example 4. This application was air-dried. The panes were then cured in a conventional drying at 190° C. for 30 minutes and were rinsed with hot tap water before measurements of the un-rolling angle were made. The values reported in Table 6 are the average of two panes, with three drops measured for each pane, for a total of six drops. The initial un-rolling angles are noted in Table 6 below.

TABLE 6

| Sample # | $ZrO_2$ Film Depth | Initial Unrolling° |
|---|---|---|
| 23 | 0.001" | 1.2° |
| 24 | 0.001" | 6.5° |
| 25 | 0.003" | 0° |
| 26 | 0.003" | 0° |
| 27 | 0.005" | 1° |
| 28 | 0.005" | 4.3° |

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A process for forming a hydrophobic micro-rough outer surface of an inorganic material on a glass substrate, the process comprising:
   providing a glass substrate;
   forming a first layer on the glass substrate by plasma spraying particles of inorganic oxide material having an average diameter greater than 0.2 microns but less than 100 microns using a plasma gas arc flame at a temperature of about 7,000 K to about 20,000 K;
   forming a second layer on the first layer by plasma spraying particles of inorganic material having an average diameter that is less than half of the average diameter of the particles forming the first layer, using a plasma gas arc flame at a temperature of about 7,000 K to about 20,000 K;
   whereby the outer surface of the second layer that is formed is hydrophobic, micro-rough and exhibits a self-cleaning property.

2. The process according to claim 1 wherein the particles of inorganic oxide material plasma sprayed on the glass substrate to form the first layer comprise oxides of one or more elements selected from the group consisting of Si, Al, Bi, P, Ti, Sr, Y, Nb, Ba, La, Ta, Sn, Sb, B, Ca, Li, Na, K, Zn, Te, Ge, Ga, Ce, Pr, Nd, Cr, Mn, Fe, Ni, Cu, Go, W and Mo.

3. The process according to claim 1 wherein the particles of inorganic material plasma sprayed on the first layer to form the second layer comprise oxides of one or more elements selected from the group consisting of Si, Al, Bi, P, Ti, Sr, Y, Nb, Ba, La, Ta, Sn, Sb, B, Ca, Li, Na, K, Zn, Te, Ge, Ga, Ce, Pr, Nd, Cr, Mn, Fe, Ni, Cu, Go, W and Mo.

4. The process according to claim 1 wherein the particles of inorganic material plasma sprayed on the first layer to form the second layer comprise nitrides, carbides, fluorides, sulfides, nitrates and/or carbonates of one or more elements selected from the group consisting of Si, Al, Bi, P, Ti, Sr, Y, Nb, Ba, La, Ta, Sn, Sb, B, Ca, Li, Na, K, Zn, Te, Ge, Ga, Ce, Pr, Nd, Cr, Mn, Fe, Ni, Cu, Go, W and Mo.

5. The process according to claim 1 wherein the particles of inorganic oxide material plasma sprayed on the glass substrate to form the first layer have the same composition as the particles of inorganic material plasma sprayed on the first layer to form the second layer.

6. The process according to claim 1 wherein the particles of inorganic oxide material plasma sprayed on the glass substrate to form the first layer have a different composition than the particles of inorganic material plasma sprayed on the first layer to form the second layer.

7. The method according to claim 1 further comprising applying a hydrophobic material to the second layer.

* * * * *